Patented Mar. 20, 1945

2,371,660

UNITED STATES PATENT OFFICE 2,371,660

COMPOSITION AND ARTICLE FOR ELECTRIC USE

Eugene Wainer, Niagara Falls, N. Y., assignor to The Titanium Alloy Manufacturing Company, New York, N. Y., a corporation of Maine No Drawing. Application February 7, 1941, Serial No. 377,851

13 Claims. (Cl. 201—76)

This invention relates to ceramic materials having special electric properties and the method of making the same. More particularly, it relates to such materials containing titanium dioxide.

In accordance with this invention, it has been discovered that varied and usual electrical effects are obtainable with ceramic bodies containing titanium oxide and one or more oxides of the group chromium, vanadium and copper, with or without iron oxide. All these elements, including titanium and iron, are heavy metals with atomic numbers between 22 and 29, and atomic weights between 47 and 64. In general, these bodies or combinations, fired into the form of a ceramic mass, are characterized by high dielectric constants of the order of pure titanium oxide, high power factors, and medium to relatively low resistivities. The resistivities are generally less than one millionth of that of pure titanium dioxide, although certain combinations, particularly those containing titanium oxide and copper oxide alone, may exhibit resistivities up to 2% of that of pure titanium oxide. The power factors in some cases reach as high as 100%, and the bodies are then admirably suited for heat producing elements in electric furnaces.

The chemical form in which these oxides are present in the final body depends upon the order in which they are combined with each other, different results being obtained, for example, (a) by first firing together CuO and $TiO_2$, then adding $V_2O_5$ and refiring, and (b) by first firing $V_2O_5$ and $TiO_2$, then adding CuO and refiring. The final mass may contain single or double titanates, or titanates combined with oxides, or mixtures thereof. In any case, it is preferred to prepare the ceramic dielectric material from prefired or preformed titanates, particularly in the case of copper titanate and vanadium titanate. The reason for this is that a mixture of the raw oxides shrinks so markedly in firing (i. e., in forming the titanates) that pieces of uniform dimensions and structure are difficult to obtain. In addition, where two oxides (e. g., $V_2O_5$ and CuO) are present in addition to titanium oxide, both will tend to combine with $TiO_2$ to form vanadium titanate and copper titanate, or to combine with each other to form copper vanadate. Under such circumstances it will be difficult to accurately control the amount of each constituent present and therefore the electrical characteristics of the body.

On the other hand, used of the oxides directly permits the use of only a single firing operation. In those cases where only a single oxide is employed besides titanium oxide, where the shrinkage on firing is not excessive, and where the firing temperature is high (so that the cost of two firing operations is appreciable), the bodies may advantageously be formed directly from the oxides. This is most applicable in the case of chromium titanate.

These combinations may be formed in a number of different ways, depending upon the various ingredients involved. Thus the titanates of vanadium, chromium or copper may be first formed by heating the oxide of the corresponding metal with titanium oxide at an appropriately elevated temperature. These titanates may contain the oxides in various molecular proportions, from one mol of $TiO_2$ to two mols of vanadium, chromium or copper oxide, to twenty or thirty mols of $TiO_2$ to one mol of vanadium, chromium or copper oxide. The resulting products may consist of one titanate alone, or a combination of two or more titanates, or a combination of one or more titanates with titanium oxide. For convenience they will be referred to as a single titanate. Thus, a compound formed by firing one mol of $Cr_2O_3$ with twelve mols of $TiO_2$ will be referred to as $Cr_2Ti_{12}O_{27}$, although it might actually exist, for example, as an intimate mixture of $Cr_2Ti_{20}O_{43}$ and $Cr_2Ti_4O_{11}$.

The temperatures at which these titanates are formed depends on the oxide employed and the ratio of the oxide with $TiO_2$. In the case of vanadium titanates, it varies from about 1200° F. for $V_4TiO_{12}$ to over 2000° F. for compounds containing 20 to 30 mols of $TiO_2$ per mol of $V_2O_5$. In the case of the chromium titanates, the temperature is somewhat higher, being about 2600° F. and in any case in excess of 2000° F. In the case of copper titanate, a preferred temperature is about 1600° F. for the compound $CuTiO_3$.

The temperatures at which the final ceramic bodies are fired also vary with the particular composition. In all cases this temperature should be sufficiently high to secure a dense, uniform, coherent, non-porous structure. In addition, in many cases, particularly those bodies containing vanadium, firing or maturing temperatures above a certain maximum should be avoided. In other cases, the upper temperature limit is not particularly important, as crystalline growth does not appear to be a disadvantage as in the case of titanium dioxide bodies of high resistivity, low power factor and high dielectric constant as described in copending application Serial No. 270,462, filed April 27, 1939. In the case of those bodies containing vanadium, however, there is a strong tendency for the structure to melt heterogeneously, a low melting point liquid leaching out, leaving a porous and highly shrunk structure of higher melting point. The indications are that such structures are mixtures of solid solutions or mixed crystals, and care must be taken to insure not to exceed the proper maturation point on firing. With some of the other bodies also a certain maximum maturation point is observed, beyond which the electrical characteristics are not as satisfactory.

In the fabrication of bodies according to the present invention, it has been found possible to secure a wide range of electrical characteristics, according to the particular composition used, the firing temperature, and sometimes other factors. In commercial applications, it is extremely desirable that such a group of materials be available for varied uses, and such materials can be selected according to the electrical characteristics described herein. Thus, for use as heat-producing elements in electric induction furnaces, a material of low resistivity, high power factor (as close to 100% as possible) and high refractoriness is desired. Such materials are ceramic bodies containing chromium titanate plus iron oxide, with melting or disintegration temperatures about 2500° F. or above, and resistivities of less than 1 kilohm/cm. in some cases, with lower resistivities at elevated temperatures.

The resistivities of all these bodies vary with temperature, but the direction and degree of variation is different with different bodies. Thus, bodies containing copper titanate (or copper titanate plus titanium dioxide) generally show a marked increase of resistivity with temperature (positive temperature coefficient), although bodies containing 1 mol or more of CuO per mol of $TiO_2$ show positive temperature coefficients of resistivity at low temperatures, and then negative temperature coefficients at higher temperatures. Other bodies showing the latter effect are certain bodies containing chromium titanate plus iron oxide, or vanadium titanate plus iron oxide. Certain bodies containing vanadium titanate plus copper oxide show negative temperature coefficients of resistivity at low temperatures, and then positive temperature coefficients at higher temperatures. Most of the bodies according to the present invention exhibit negative temperature coefficients of resistivity throughout the entire temperature scale, at least up to 150° C. Thus it is evident that any combination of temperature coefficients, positive, negative or neutral, is available by suitable combination of resistors of the various materials. For example, if a neutral temperature coefficient or a constant resistivity at any one temperature is desired, the use of the combination of one resistor with negative coefficient and another with positive coefficient is indicated, so that one resistor will neutralize the other, etc.

Concerning the magnitude of the resistivity, bodies containing copper titanate or copper titanate plus titanium dioxide show by far the highest values. Bodies containing vanadium generally show very low resistivities (e. g., vanadium titanate, chromium titanate plus vanadium oxide, copper titanate plus vanadium oxide, vanadium titanate plus copper oxide, vanadium titanate plus iron oxide), although the lowest resistivity of all is exhibited by bodies containing copper titanate plus iron oxide. Iron oxide and copper oxide have the effect of increasing the resistivity of vanadium titanate, although iron oxide decreases the resistivity of copper titanate enormously, while both iron oxide and copper oxide decrease the resistivity of chromium titanate. In general, the resistivities of all the bodies decrease with increase in firing temperature, providing maturation is not exceeded, though in some cases the resistivity will decrease to a certain point and then increase beyond that point as with copper titanate. Increase in $TiO_2$ tends to increase resistivity, but again copper titanate is anomalous since it appears to increase in resistance with increase in $TiO_2$ and then decrease with further increments of $TiO_2$. Thorough drying of the bodies appears to lower the resistivities.

Besides the very low resistivities exhibited by bodies containing copper titanate plus iron oxide, they have unusual characteristics in other respects. They exhibit marked magnetic permeability, particularly as the amount of $Fe_2O_3$ is increased and with moderately high firing temperatures. It is altogether possible that the magnetism is due to the formation and crystallization of magnetite in the firing procedure, which would have to be proved by petrographic analysis. The fact that other bodies containing iron oxide show no magnetic properties and that this development is peculiar only to those bodies containing copper oxide may point to a condition other than the presence of magnetite, particularly since the behavior of bodies containing copper oxide has already exhibited anomalies. However the possible presence of magnetite is also indicated by the fact that those compositions higher in $Fe_2O_3$ are more strongly magnetic the higher the firing temperature. It also appears that the magnetic hysteresis of these strongly magnetic bodies is slight, this conclusion being based on the fact that, after the pieces were picked up by a small Al-Ni-Co magnet, the bodies immediately after release had not retained sufficient magnetism to attract a minute piece of metallic iron.

Certain of these bodies show a very unusual property, referred to hereinafter as the "hand effect." This property consists in a continual variation of the value of the resistance when the hand of an observer is placed within a fraction of an inch of a body through which a current is being passed. This property is particularly noticeable if the fingers are ringed around the test specimen without coming in actual contact with the test piece. The same type of effect is obtained if a coil of bare wire encircles the test piece, not touching, and the coil is held in the fingers. As soon as the hand or hand held coil of wire is removed from the vicinity of the test piece, the resistance rapidly returns to its original value. The fact that all measurements are D. C. rules out possible inductance effects. It was first thought the effect is due to a particular sensitivity of the resistance of the bodies to variations in temperature, but in some cases the effect of heat and hand proximity are in opposite directions, which serves to eliminate the effect of heat. It was then thought that moisture may be the causative factor but the same variation is obtained if the body is first wrapped in glazed paper. The cause of this "hand effect" is at present unknown.

The invention having been described, the following specific examples are given, with electrical and other measurements thereon to indicate suitable commercial applications.

GENERAL

In all the accompanying examples the bodies were prepared by mixing the ingredients, using a 5% gelatin solution for temporary bond, and then pressed into pieces roughly 1¼ inches in diameter and ¼ inch thick by means of a Carver press. The bodies were then thoroughly dried at 110° C., placed in zircon saggers or crucibles, imbedded in zircon sand, and fired to the temperatures indicated below. The firing schedule was as follows: Peak temperature was attained in 3 hours, this temperature maintained for 2 hours unless otherwise noted, and the furnace then shut off. All firings below 1800° F. were carried out in an electric muffle furnace, and all firings above 1800° F. in a gas fired pot furnace. After firing, the dimensions of the bodies were measured and the flat surfaces then were sprayed with copper, using the familiar Schoop gun. In a few cases, particularly where the structures were immature, the copper plate did not stick. In these cases (indicated in the tables) lead foil and petrolatum were used.

In general the raw materials used were pure oxides, those of $Cr_2O_3$, $Fe_2O_3$, and $TiO_2$ being first quality pigment grades, $V_2O_5$ containing 15% water of hydration, and CuO a chemically pure grade.

With regard to the test figures, resistivities were obtained on a General Radio megohm bridge and an impedance bridge. All values obtained were direct current resistances. Those determined on the megohm bridge were measured at 135 volts, while the values determined on the impedance bridge were measured at 6 volts and 45 volts. Wherever the resistance was too high to be obtained on the impedance bridge, the megohm bridge was used and its use indicated in the table of data. In general the resistance of each body was measured after a charging interval of 1 minute. Increasing the charging period usually yielded higher resistivity values though in many cases it was found that such increase in charging interval either yielded a constant or decreasing level of resistance. All bodies (except those for temperature coefficient) were measured at 20 to 25° C. and at 50 to 60% relative humidity. In some cases, in order to determine the effect of thorough drying on the values, bodies were measured before and after thorough drying at 110° C., the dried bodies being cooled in a desiccator. These bodies are indicated in the tables.

The temperature coefficient of resistivity was normally determined on a heat up schedule to 150° C. followed by a soak period of 10 minutes at 150° C. to insure uniformity of temperature at that level. In a few instances, as indicated in the tables, the temperature was carried to 200° C. The hot chamber was constructed as follows: A grounded iron plate was placed on top of a covered unit electric hot plate. On this iron plate was constructed a chamber (of inside dimensions 4½ inches wide, 9 inches high, and 4½ inches deep) of refractory insulating brick of a high degree of thermal insulation. Slots were cut for horizontal insertion of the electrodes carrying the test piece, and a hole in the roof for insertion of the thermometer in close proximity to the test piece. No means of holding the insulating brick together were found necessary. This construction required no correction for furnace influence, and the temperature schedules obtained were very uniform, due to the electrical and thermal insulation afforded by the refractory box. In obtaining the temperature resistivity values, the heating current was shut off during the actual measurement. In passing it should be noted that not all the bodies were measured on a temperature basis, which will explain the gaps in the tables.

The temperature coefficient resistivity data were all measured on the heat up schedule of the oven. Unless a very slow schedule is used the body will heat up at a slightly different rate than the amosphere surrounding the test piece, and on cooling will lose its heat at a different rate than the surrounding atmosphere, resulting in an apparent hysteresis of temperature resistivity.

EXAMPLE 1

These bodies were prepared by firing mixtures of $Cr_2O_3$ and $TiO_2$, in the following molecular proportions, to a temperature of 2600° F., to obtain chromium titanates, etc. The bodies so obtained were used and tested as such.

| | |
|---|---|
| A | 2 mols $Cr_2O_3$ + 3 mols $TiO_2$ |
| B | 1 mol $Cr_2O_3$ + 2 mols $TiO_2$ |
| C | 1 mol $Cr_2O_3$ + 4 mols $TiO_2$ |
| D | 1 mol $Cr_2O_3$ + 8 mols $TiO_2$ |
| E | 1 mol $Cr_2O_3$ + 12 mols $TiO_2$ |
| F | 1 mol $Cr_2O_3$ + 20 mols $TiO_2$ |
| G | 1 mol $Cr_2O_3$ + 1 mol $TiO_2$ |

EXAMPLE 2

These bodies were prepared by firing mixtures of $V_2TiO_7$ and $TiO_2$, in the following molecular proportions, to temperatures of 1200°, 1400° and 1600° F. (18 bodies). Unfired (non ceramic) mixtures were also tested (6 bodies). Bodies 2D, 2E and 2F were also fired at 1800° F. for 1½ hours and for 3 hours (6 bodies). The $V_2TiO_7$ was prepared by mixing 1 mol of $V_2O_5$ and 1 mol of $TiO_2$ with water, grinding in a ball mill, drying, firing at 1200° to 1350° F. for 3 hours, cooling and disintegrating.

| | |
|---|---|
| A | 1 mol $V_2TiO_7$ |
| B | 1 mol $V_2TiO_7$ + 1 mol $TiO_2$ |
| C | 1 mol $V_2TiO_7$ + 3 mols $TiO_2$ |
| D | 1 mol $V_2TiO_7$ + 7 mols $TiO_2$ |
| E | 1 mol $V_2TiO_7$ + 11 mols $TiO_2$ |
| F | 1 mol $V_2TiO_7$ + 19 mols $TiO_2$ |

EXAMPLE 3

These bodies were prepared by firing mixtures of $CuTiO_3$ and $TiO_2$ (or CuO in one case), in the following molecular proportions, to temperatures of 1600°, 1700°, 1800°, 1950°, 2150°, and 2250° F. The $CuTiO_3$ was prepared by mixing 1 mol of CuO and 1 mol of $TiO_2$ with water, grinding in a ball mill, drying, firing at 1600° F. for 3 hours, cooling and disintegrating.

| | |
|---|---|
| A | 1 mol $CuTiO_3$ |
| B | 1 mol $CuTiO_3$ + 1 mol $TiO_2$ |
| C | 1 mol $CuTiO_3$ + 3 mols $TiO_2$ |
| D | 1 mol $CuTiO_3$ + 7 mols $TiO_2$ |
| E | 1 mol $CuTiO_3$ + 11 mols $TiO_2$ |
| F | 1 mol $CuTiO_3$ + 19 mols $TiO_2$ |
| G | 1 mol $CuTiO_3$ + 1 mol CuO |

EXAMPLE 4

These bodies were prepared by firing mixtures of $Cr_2Ti_{12}O_{27}$ and $Fe_2O_3$ in the following molecular proportions, to temperatures of 1850°, 1950°, 2050°, 2200°, 2350°, and 2500° F. (36 bodies). The $Cr_2Ti_{12}O_{27}$ was prepared by mixing 1 mol of $Cr_2O_3$ and 12 mols of $TiO_2$ with water, grinding in a ball mill, drying, firing at 2600° F. for 3 hours, cooling, and disintegrating.

| | |
|---|---|
| A | 1 mol $Cr_2Ti_{12}O_{27}$ + 1 mol $Fe_2O_3$ |
| B | 1 mol $Cr_2Ti_{12}O_{27}$ + 2 mols $Fe_2O_3$ |
| C | 1 mol $Cr_2Ti_{12}O_{27}$ + 4 mols $Fe_2O_3$ |
| D | 1 mol $Cr_2Ti_{12}O_{27}$ + 8 mols $Fe_2O_3$ |
| E | 1 mol $Cr_2Ti_{12}O_{27}$ + 12 mols $Fe_2O_3$ |
| F | 1 mol $Cr_2Ti_{12}O_{27}$ + 20 mols $Fe_2O_3$ |

EXAMPLE 5

These bodies were prepared by firing mixtures of $Cr_2Ti_{12}O_{27}$ and CuO in the following molecular proportions, to temperatures of 1600°, 1700°, 1800°, 1850°, 1950°, 2050°, 2150°, 2250°, 2350° and 2450° F. The $Cr_2Ti_{12}O_{27}$ was prepared as in Example 4.

| | |
|---|---|
| A | 1 mol $Cr_2Ti_{12}O_{27}$+ 1 mol CuO |
| B | 1 mol $Cr_2Ti_{12}O_{27}$+ 2 mols CuO |
| C | 1 mol $Cr_2Ti_{12}O_{27}$+ 4 mols CuO |
| D | 1 mol $Cr_2Ti_{12}O_{27}$+ 8 mols CuO |
| E | 1 mol $Cr_2Ti_{12}O_{27}$+12 mols CuO |
| F | 1 mol $Cr_2Ti_{12}O_{27}$+20 mols CuO |

EXAMPLE 6

These bodies were prepared by firing mixtures of $Cr_2Ti_{12}O_{27}$ and $V_2O_5$ in the following molecular proportions, to temperatures of 1100°, 1200°, 1300°, 1400°, 1500°, 1600°, 1700°, 1800°, 1900°, 2000°, and 2100° F. The $Cr_2Ti_{12}O_{27}$ was prepared as in Example 4.

| | |
|---|---|
| A | 1 mol $Cr_2Ti_{12}O_{27}$+ 1 mol $V_2O_5$ |
| B | 1 mol $Cr_2Ti_{12}O_{27}$+ 2 mols $V_2O_5$ |
| C | 1 mol $Cr_2Ti_{12}O_{27}$+ 4 mols $V_2O_5$ |
| D | 1 mol $Cr_2Ti_{12}O_{27}$+ 8 mols $V_2O_5$ |
| E | 1 mol $Cr_2Ti_{12}O_{27}$+12 mols $V_2O_5$ |
| F | 1 mol $Cr_2Ti_{12}O_{27}$+20 mols $V_2O_5$ |

EXAMPLE 7

These bodies were prepared by firing mixtures of $CuTiO_3$ and $Fe_2O_3$ in the following molecular proportions, to temperatures of 1600°, 1700°, 1800°, 1900°, 2000°, 2100°, and 2200° F. The $CuTiO_3$ was prepared as in Example 3.

| | |
|---|---|
| A | 1 mol $CuTiO_3$+ 1 mol $Fe_2O_3$ |
| B | 1 mol $CuTiO_3$+ 2 mols $Fe_2O_3$ |
| C | 1 mol $CuTiO_3$+ 4 mols $Fe_2O_3$ |
| D | 1 mol $CuTiO_3$+ 8 mols $Fe_2O_3$ |
| E | 1 mol $CuTiO_3$+12 mols $Fe_2O_3$ |
| F | 1 mol $CuTiO_3$+20 mols $Fe_2O_3$ |

EXAMPLE 8

These bodies were prepared by firing mixtures of $CuTiO_3$ and $V_2O_5$ in the following molecular proportions, to temperatures of 1100°, 1200°, 1300°, 1400°, and 1600° F. The $CuTiO_3$ was prepared as in Example 3.

| | |
|---|---|
| A | 1 mol $CuTiO_3$+ 1 mol $V_2O_5$ |
| B | 1 mol $CuTiO_3$+ 2 mols $V_2O_5$ |
| C | 1 mol $CuTiO_3$+ 4 mols $V_2O_5$ |
| D | 1 mol $CuTiO_3$+ 8 mols $V_2O_5$ |
| E | 1 mol $CuTiO_3$+12 mols $V_2O_5$ |
| F | 1 mol $CuTiO_3$+20 mols $V_2O_5$ |

EXAMPLE 9

These bodies were prepared by firing mixtures of $V_2TiO_7$ and CuO, in the following molecular proportions, to temperatures of 1200°, 1400°, 1600°, and 1800° F. The $V_2TiO_7$ was prepared as in Example 2.

| | |
|---|---|
| A | 1 mol $V_2TiO_7$+ 1 mol CuO |
| B | 1 mol $V_2TiO_7$+ 2 mols CuO |
| C | 1 mol $V_2TiO_7$+ 4 mols CuO |
| D | 1 mol $V_2TiO_7$+ 8 mols CuO |
| E | 1 mol $V_2TiO_7$+12 mols CuO |
| F | 1 mol $V_2TiO_7$+20 mols CuO |

EXAMPLE 10

These bodies were prepared by firing mixtures of $V_2TiO_7$ and $Fe_2O_3$, in the following molecular proportions, to temperatures of 1200°, 1400°, 1600°, 1800°, and 2000° F. The $V_2TiO_7$ was prepared as in Example 2.

| | |
|---|---|
| A | 1 mol $V_2TiO_7$+ 1 mol $Fe_2O_3$ |
| B | 1 mol $V_2TiO_7$+ 2 mols $Fe_2O_3$ |
| C | 1 mol $V_2TiO_7$+ 4 mols $Fe_2O_3$ |
| D | 1 mol $V_2TiO_7$+ 8 mols $Fe_2O_3$ |
| E | 1 mol $V_2TiO_7$+12 mols $Fe_2O_3$ |
| F | 1 mol $V_2TiO_7$+20 mols $Fe_2O_3$ |

The accompanying tables indicate physical and electrical measurements made on bodies prepared and fired as in the above examples.

Table I shows shrinkage of the body, in percentage of its unfired diameter. A + sign indicates expansion. Gaps in this table show that bodies were not successfully fired at the temperatures indicated. In relation to these figures, a rather pronounced break in some cases will be noted between 1800° F. and the next recorded temperature, which represents the change-over from electric to gas firing. This break cannot be laid to the body itself, but rather to the difficulty of correlating the two types of firing when one is used at its maximum and the other at its minimum. The indications are that the shrinkage at 1850° F. (lowest gas firing) should be higher than actually found, and probably would reach the indicated proper value if longer firing schedules had been used. These variations may be due to an actual chemical or physical change in the composition as influenced by the combustion products of the gas used in firing. The subsequent electrical data bear out this contention. Further correlations between shrinkage, electric firing versus gas firing, and electrical data are evident upon examination of the data and will be noted below.

TABLE I

| Example | Firing temperatures, degrees F. | | | | | |
|---|---|---|---|---|---|---|
| | 2,600 | | | | | |
| 1A | 10.2 | | | | | |
| 1B | 9.5 | | | | | |
| 1C | 3.5 | | | | | |
| 1D | 11.6 | | | | | |
| 1E | 11.3 | | | | | |
| 1F | 12.0 | | | | | |
| 1G | 14.1 | | | | | |
| | 1,200 | 1,400 | 1,600 | 1,800 (1½ hrs.) | 1,800 (3 hrs.) | |
| 2A | 3.16 | 9.15 | 15.1 | | | |
| 2B | 3.52 | 7.04 | 6.69 | | | |
| 2C | 4.22 | 8.43 | 8.43 | | | |
| 2D | 3.87 | 6.33 | 10.5 | 12.0 | 9.85 | |
| 2E | 3.16 | 10.5 | 11.6 | 12.6 | 12.3 | |
| 2F | 1.76 | 10.5 | 11.2 | 11.6 | 12.2 | |
| | 1,600 | 1,700 | 1,800 | 1,950 | 2,100 | 2,250 |
| 3A | 0.706 | 1.76 | 9.16 | 12.0 | 12.0 | 13.4 |
| 3B | 0.00 | 2.11 | 10.2 | 13.4 | 12.7 | 12.7 |
| 3C | 2.46 | 3.17 | 13.4 | 13.4 | 13.7 | 14.4 |
| 3D | 3.52 | 6.70 | 14.8 | 14.1 | 16.2 | 19.3 |
| 3E | 5.98 | 8.81 | 19.0 | 15.8 | 17.9 | 17.9 |
| 3F | 8.45 | 12.0 | 19.0 | 19.0 | 15.5 | 19.0 |
| 3G | 0.00 | 0.705 | 9.86 | 15.5 | | |
| | 1,850 | 1,950 | 2,050 | 2,200 | 2,350 | 2,500 |

TABLE I—Continued

| Example | Firing temperatures, degrees F. | | | | | | | | | | |
|---|---|---|---|---|---|---|---|---|---|---|---|
|  | 2,600 | | | | | | | | | | |
| 4A | 0.705 | 3.16 | 2.81 | 5.28 | 12.7 | 14.1 | | | | | |
| 4B | 2.46 | 2.46 | 3.16 | 5.99 | 10.5 | 12.7 | | | | | |
| 4C | 3.52 | 1.76 | 1.76 | 4.22 | 11.3 | 11.3 | | | | | |
| 4D | 6.69 | 2.11 | 0.105 | 3.16 | ------ | 6.69 | | | | | |
| 4E | 7.40 | 2.46 | 2.46 | 4.93 | 9.15 | 8.80 | | | | | |
| 4F | 10.5 | 8.45 | 6.69 | 9.15 | 12.0 | 15.5 | | | | | |
|  | 1,500 | 1,600 | 1,700 | 1,800 | 1,850 | 1,950 | 2,050 | 2,150 | 2,250 | 2,350 | 2,450 |
| 5A | ------ | ------ | ------ | ------ | 7.97 | 6.94 | 12.5 | 6.94 | 11.8 | 5.21 | 11.8 |
| 5B | | | | | 11.4 | 11.4 | 11.8 | ------ | 12.1 | 9.39 | 13.5 |
| 5C | | | | | 10.1 | 10.1 | 12.5 | | 13.5 | 10.1 | 14.2 |
| 5D | 0.00 | +0.348 | +1.04 | +1.04 | 16.7 | 13.9 | 19.8 | | | | |
| 5E | +0.694 | +0.694 | +1.04 | +0.694 | 22.2 | 20.8 | 24.3 | | | | |
| 5F | +0.694 | +0.694 | +0.694 | 2.78 | 29.5 | 23.6 | 24.3 | | | | |
|  | 1,100 | 1,200 | 1,300 | 1,400 | 1,500 | 1,600 | 1,700 | 1,800 | 1,900 | 2,000 | 2,100 |
| 6A | ------ | ------ | ------ | 0.00 | 0.00 | 0.347 | 0.347 | 0.695 | 2.08 | 3.47 | 3.47 |
| 6B | | | | 0.347 | 1.04 | 1.39 | 2.08 | 2.78 | 2.78 | 6.25 | 7.30 |
| 6C | | | | 2.08 | 2.43 | 3.82 | 5.21 | 7.03 | 5.21 | 9.73 | 11.8 |
| 6D | 2.78 | 2.08 | 2.78 | 3.47 | 5.21 | 13.2 | 11.5 | 16.7 | | | |
| 6E | 3.47 | 4.17 | 3.47 | 5.55 | 14.6 | 22.6 | 14.9 | | | | |
| 6F | 3.82 | 5.91 | 13.2 | 14.6 | 26.7 | 16.7 | 13.2 | 20.2 | | | |
|  | 1,600 | 1,700 | 1,800 | 1,900 | 2,000 | 2,100 | 2,200 | | | | |
| 7A | 4.55 | 7.69 | 2.80 | 9.45 | ------ | 16.1 | ------ | | | | |
| 7B | 11.9 | 11.9 | 7.69 | 14.3 | 15.0 | 16.4 | 18.9 | | | | |
| 7C | 15.0 | 14.0 | 12.2 | 16.4 | 16.4 | 18.9 | 19.9 | | | | |
| 7D | 16.8 | 16.8 | 13.6 | 18.9 | 18.9 | 18.9 | 20.6 | | | | |
| 7E | 17.3 | 18.3 | 16.6 | 19.7 | 19.7 | 19.7 | 21.1 | | | | |
| 7F | 20.9 | 20.2 | 19.2 | 19.9 | 21.3 | 19.5 | ------ | | | | |
|  | 1,100 | 1,200 | 1,300 | 1,400 | 1,600 | | | | | | |
| 8A | 2.47 | 8.13 | 12.4 | 17.3 | 21.9 | | | | | | |
| 8B | 5.68 | 15.6 | 17.7 | 22.0 | ------ | | | | | | |
| 8C | 4.29 | 13.2 | ------ | ------ | ------ | | | | | | |
| 8D | 14.7 | 18.6 | ------ | ------ | ------ | | | | | | |
| 8E | 12.6 | 16.2 | ------ | ------ | ------ | | | | | | |
| 8F | 6.82 | 5.38 | ------ | ------ | ------ | | | | | | |
|  | 1,200 | 1,400 | 1,600 | 1,800 | | | | | | | |
| 9A | +0.350 | 2.80 | 3.50 | 4.20 | | | | | | | |
| 9B | +0.700 | +1.40 | 4.20 | 7.35 | | | | | | | |
| 9C | +0.347 | 0.00 | 7.30 | 16.7 | | | | | | | |
| 9D | 0.00 | 0.00 | 10.0 | 25.9 | | | | | | | |
| 9E | 0.00 | 0.00 | 11.8 | 20.8 | | | | | | | |
| 9F | 0.345 | 0.00 | 12.4 | 15.2 | | | | | | | |
|  | 1,200 | 1,400 | 1,600 | 1,800 | 2,000 | | | | | | |
| 10A | 1.40 | 5.25 | 4.56 | 4.56 | 8.76 | | | | | | |
| 10B | 4.26 | 7.81 | 8.16 | 9.93 | 13.1 | | | | | | |
| 10C | 2.82 | 9.86 | 12.7 | 13.4 | 12.3 | | | | | | |
| 10D | +0.356 | 14.2 | 14.9 | 16.4 | 13.9 | | | | | | |
| 10E | +0.711 | 9.25 | 16.0 | 16.4 | 12.8 | | | | | | |
| 10F | +0.351 | 4.21 | 17.5 | 17.5 | 15.8 | | | | | | |

Tables II—1, II—2, II—3, II—4, IIA—4, II—5, II—6, II—7, II—8, II—9 and II—10 indicate the resistives of the bodies according to the above examples. The temperatures are the firing temperatures of the bodies. The figures given are in kilohm/cm., except in Table II—3, where the figures are in megohm/ cm. All bodies except those listed below were copper-coated, full diameter. The following were provided with a lead foil coating, full diameter:

Unfired: Bodies 2—B, 2—C, 2—D, 2—E and 2—F.
Fired at 1200° F.: Body 2F.
Fired at 1600° F.: Bodies 3—B, 3—C and 3—D.

All bodies except those listed below were measured on the impedance bridge, at 6 volts and 45 volts, respectively, the figure at 6 volts being given first. The following bodies were measured on the megohm bridge at 135 volts:

All bodies in Table II—3.
Unfired: Bodies 2—C, 2—D, 2—E and 2—F.
Fired at 2200° F.: Body 4—A.
Fired at 1850° F.: Bodies 4—A, 4—B, 4—C, 5—B and 5—C.
Fired at 1950° F.: Bodies 4—B, 4—C, 5—A, 5—B, 5—C and 5—E.
Fired at 2050° F.: Bodies 4—A, 4—B, 5—C, 5—D and 5—E.
Fired at 2150° F.: Body 5—A.
Fired at 2350° F.: Body 5—C.

Except for the bodies in Table II—3, all bodies were measured at 20° to 25° C., and 50 to 60% relative humidity. All bodies in Table II—3 and also in Table IIA—4 (the same bodies as in Table II—4) were measured after thorough drying at 110° C. and subsequent cooling in a desiccator.

TABLE II—1

| Example | |
|---|---|
| 1A | { 926 |
|  | { 769 |
| 1B | { 567 |
|  | { 493 |
| 1C | 729 |
|  | 644 |
| 1D | 316 |
|  | 286 |
| 1E | 276 |
|  | 209 |
| 1F | 461 |
|  | 400 |
| 1G | { 1,450 |
|  | { 1,200 |

TABLE II—2

|  | Degrees F. | | | | | |
|---|---|---|---|---|---|---|
|  | Unfired | 1,200 | 1,400 | 1,600 | 1,800 (1½ hrs.) | 1,800 (5 hrs.) |
| 2A | 2.94 / 2.96 | 0.376 / 0.378 | 0.0271 / 0.0271 | 0.0500 / 0.0525 | ------ | ------ |
| 2B | 91.8 / 86.9 | 0.588 / 0.588 | 0.0251 / 0.0251 | 0.0751 / 0.0751 | ------ | ------ |
| 2C | 6,060 | 4.06 / 4.06 | 0.146 / 0.147 | 0.192 / 0.192 | ------ | ------ |
| 2D | 62,400 | 15.0 / 14.6 | 8.90 / 8.90 | 1.03 / 1.03 | 2.01 / 2.00 | 0.881 / 0.867 |
| 2E | 240,000 | 49.1 / 48.6 | 11.7 / 11.3 | 9.76 / 9.06 | 32.7 / 32.5 | 9.60 / 9.23 |
| 2F | 432,000 | 353 / 291 | 244 / 238 | 330 / 320 | 620 / 533 | 505 / 468 |

TABLE II—3

[Megohm/cm.]

|  | Degrees F. | | | | | |
|---|---|---|---|---|---|---|
|  | 1,600 | 1,700 | 1,800 | 1,950 | 2,100 | 2,250 |
| 3A | 7,750 | 39.5 | 59.4 | 382 | ------ | ------ |
| 3B | 12.2 | 9.65 | 8.64 | 54.5 | 502 | 244 |
| 3C | 24,000 | 10.5 | 149 | 288 | 5,740 | 6,400 |
| 3D | 49,800 | 4.83 | 35.2 | 201 | 4,290 | 8,010 |
| 3E | 19.7 | 7.90 | 156 | 80.0 | 718 | 6,660 |
| 3F | 8.84 | 10.9 | 52,400 | 4,760 | 4,330 | 12,400 |
| 3G | 155 | 19.7 | 79.7 | ------ | ------ | ------ |

TABLE II—4

|  | Degrees F. | | | | | |
|---|---|---|---|---|---|---|
|  | 1,850 | 1,950 | 2,050 | 2,200 | 2,350 | 2,500 |
| 4A | ------ | 4,130 / 2,940 | ------ | 4,310 | 282 / 216 | ------ |
| 4B | ------ | ------ | 1,020 / 951 | ------ | 20.1 / 18.9 | 1.56 / 1.48 |
| 4C | ------ | ------ | 2,400 / 2,100 | 131 / 127 | ------ | 1.57 / 1.52 |
| 4D | 920 / 997 | 1,360 / 1,310 | 153 / 150 | 47.8 / 46.4 | ------ | 1.05 / 1.04 |
| 4E | 246 / 226 | 408 / 402 | 46.9 / 46.3 | 19.1 / 18.6 | 0.721 / 0.721 | 0.621 / 0.605 |
| 4F | 23.8 / 23.5 | 49.1 / 47.3 | 8.15 / 7.82 | 0.562 / 0.554 | 0.272 / 0.274 | 0.175 / 0.175 |

TABLE IIA—4

|  | Degrees F. | | | | | |
|---|---|---|---|---|---|---|
|  | 1,850 | 1,950 | 2,050 | 2,200 | 2,350 | 2,500 |
| 4A | 6,360 | 3,360 / 3,040 | 3,680 | 3,840 | 296 / 216 | 30.0 / 24.7 |
| 4B | 5,060 | 3,900 | 4,720 | 852 / 852 | 21.1 / 19.4 | 1.85 / 1.72 |
| 4C | 3,540 | 3,040 | 1,510 / 1,430 | 98.0 / 95.0 | 0.906 / 0.906 | 1.43 / 1.40 |
| 4D | 754 / 688 | 1,060 / 1,020 | 120 / 121 | 40.1 / 40.1 | ------ | 0.985 / 0.960 |
| 4E | 114 / 122 | 287 / 290 | 37.2 / 37.4 | 16.4 / 16.2 | 0.667 / 0.663 | 0.588 / 0.583 |
| 4F | 18.6 / 18.7 | 42.4 / 40.6 | 7.00 / 6.81 | 0.531 / 0.531 | 0.268 / 0.270 | 0.168 / 0.168 |

TABLE II—5

|  | Degrees F. | | | | | | | | | |
|---|---|---|---|---|---|---|---|---|---|---|
|  | 1,600 | 1,700 | 1,800 | 1,850 | 1,950 | 2,050 | 2,150 | 2,250 | 2,350 | 2,450 |
| 5A | ------ | ------ | ------ | 3,230 / 3,150 | 13,700 | ------ | 14,800 | 2,700 / 2,360 | ------ | 3,140 / 2,910 |
| 5B | ------ | ------ | 19,900 | 14,100 | 2,920 / 2,850 | | 1,510 / 1,410 | 2,120 / 2,120 | 1,160 / 1,440 | |
| 5C | ------ | ------ | ------ | 7,850 | 14,600 | 65,400 | 401 / 392 | 42,900 | 240 / 222 | |
| 5D | 1,020 / 984 | 204 / 198 | 36.4 / 35.9 | 1,950 / 1,860 | 4,740 / 6,150 | 27,100 | ------ | ------ | ------ | ------ |
| 5E | 386 / 336 | 149 / 146 | 31.2 / 31.0 | 711 / 711 | 9,150 | 6,710 | ------ | ------ | ------ | ------ |
| 5F | 71.2 / 66.6 | 63.9 / 61.8 | 21.8 / 21.5 | 428 / 425 | 1,900 / 1,900 | 1,870 / 1,830 | ------ | ------ | ------ | ------ |

TABLE II—6

|  | Degrees F. | | | | | | | | | |
|---|---|---|---|---|---|---|---|---|---|---|
|  | 1,100 | 1,200 | 1,300 | 1,400 | 1,500 | 1,600 | 1,700 | 1,800 | 1,900 | 2,000 | 2,100 |
| 6A | ------ | ------ | ------ | 1,080 / 1,080 | 1,770 / 1,750 | 755 / 741 | 532 / 520 | 514 / 495 | 514 / 506 | 378 / 369 | 517 / 505 |
| 6B | ------ | ------ | ------ | 62.6 / 61.4 | 73.1 / 73.1 | 50.4 / 48.7 | 35.2 / 34.9 | 45.8 / 44.6 | 33.6 / 33.1 | 22.2 / 22.0 | 23.7 / 23.7 |
| 6C | ------ | ------ | ------ | 0.564 / 0.558 | 0.709 / 0.709 | 0.891 / 0.888 | 1.64 / 1.63 | 0.915 / 0.908 | 1.01 / 1.01 | 0.327 / 0.327 | 0.275 / 0.276 |
| 6D | 18.0 / 17.4 | 50.5 / 46.4 | 0.0346 / 0.0346 | 0.0461 / 0.0461 | 0.0511 / 0.0515 | 0.0616 / 0.0616 | 0.0912 / 0.0920 | 0.167 / 0.167 | ------ | ------ | ------ |
| 6E | 5.19 / 4.76 | 22.9 / 22.2 | 0.0157 / 0.0157 | 0.0275 / 0.0275 | 0.0465 / 0.0465 | 0.0690 / 0.0690 | ------ | ------ | ------ | ------ | ------ |
| 6F | 1.65 / 1.64 | 6.58 / 6.26 | 0.0123 / 0.0123 | 0.0137 / 0.0137 | 0.0396 / 0.0396 | 0.140 / 0.140 | 0.143 / 0.143 | 0.113 / 0.113 | ------ | ------ | ------ |

TABLE II—7

|  | Degrees F. | | | | | | |
|---|---|---|---|---|---|---|---|
|  | 1,600 | 1,700 | 1,800 | 1,900 | 2,000 | 2,100 | 2,200 |
| 7A | 459 / 241 | 159 / 98.0 | 413 / 127 | 19 / 19.7 | ------ | ------ | ------ |
| 7B | 196 / 181 | 373 / 362 | 2.89 / 2.16 | 0.0797 / 0.0797 | 2.08 / 1.95 | 1.38 / 1.31 | ------ |
| 7C | 93.0 / 86.6 | 180 / 174 | 0.105 / 0.105 | 0.0103 / 0.0103 | 0.0167 / 0.0167 | 0.0108 / 0.0108 | 0.00344 / 0.00344 |
| 7D | 16.4 / 15.1 | 129 / 120 | 0.0364 / 0.0363 | 0.0356 / 0.0356 | 0.0290 / 0.0290 | 0.00614 / 0.00614 | 0.00114 / 0.00114 |
| 7E | 16.9 / 14.8 | 528 / 483 | 0.0166 / 0.0164 | 0.0131 / 0.0131 | 0.0204 / 0.0204 | 0.00610 / 0.00610 | 0.00258 / 0.00258 |
| 7F | 13.3 / 10.7 | 573 / 502 | 0.00148 / 0.00148 | 0.00833 / 0.00833 | 0.0218 / 0.0218 | 0.0133 / 0.0133 | ------ |

Table II—8

| | Degrees F. | | | | |
|---|---|---|---|---|---|
| | 1,100 | 1,200 | 1,300 | 1,400 | 1,600 |
| 8A | {2.58<br>{2.54 | 1.25<br>1.22 | 1.23<br>1.21 | 0.450<br>0.448 | 0.454<br>0.370 |
| 8B | {0.293<br>{0.293 | 0.0430<br>0.0430 | 0.0469<br>0.0466 | 0.236<br>0.236 | |
| 8C | {0.0940<br>{0.0940 | 0.0512<br>0.0500 | | | |
| 8D | {0.0760<br>{0.0760 | 0.0532<br>0.0529 | | | |
| 8E | {0.0805<br>{0.0805 | 0.0686<br>0.0680 | | | |
| 8F | {0.0544<br>{0.0544 | 0.0429<br>0.0429 | | | |

Table II—9

| | Degrees F. | | | |
|---|---|---|---|---|
| | 1,200 | 1,400 | 1,600 | 1,800 |
| 9A | {6.31<br>{6.25 | 0.906<br>0.774 | 0.555<br>0.474 | 107<br>101 |
| 9B | {1,910<br>{1,880 | 1,220<br>1,220 | 0.612<br>0.612 | 439<br>425 |
| 9C | 449<br>410 | 418<br>376 | 3.33<br>2.62 | |
| 9D | 260<br>138 | 517<br>380 | 5.16<br>3.34 | 542<br>146 |
| E | {155<br>{48.6 | 614<br>161 | 11.2<br>5.49 | 346<br>149 |
| 9F | {31.2<br>{12.8 | 248<br>30.8 | 41.4<br>15.5 | 175<br>89.0 |

Table II—10

| | Degrees F. | | | | |
|---|---|---|---|---|---|
| | 1,200 | 1,400 | 1,600 | 1,800 | 2,000 |
| 10A | {233<br>{209 | 10.0<br>10.0 | 24.0<br>23.0 | 3.31<br>3.25 | 8.13<br>7.94 |
| 10B | {302<br>{275 | 24.9<br>24.1 | 35.8<br>34.6 | 22.3<br>16.9 | 13.6<br>13.5 |
| 10C | {259<br>{214 | 52.9<br>52.0 | 58.6<br>56.2 | 37.0<br>28.8 | 40.5<br>32.4 |
| 10D | {254<br>{155 | 229<br>210 | 25.4<br>21.6 | 93.6<br>82.4 | 79.4<br>66.5 |
| 10E | {287<br>{153 | 228<br>158 | 3.78<br>3.71 | 103<br>93.1 | 233<br>196 |
| 10F | {604<br>{406 | 240<br>146 | 3.42<br>3.37 | 28.6<br>26.2 | 669<br>271 |

The temperture coefficients of resistivity of certain of the bodies are indicated in the following tables III—1, III—2, III—3, III—4, III—5, III—6, III—7, III—8, III—9, and III—10. In each case the figures given in parentheses after the table heading are the temperatures at which the bodies were fired. Except for Table III—3, the values are given in kilohm/cms. In Table III—3, the values are in megohm/cms.

Table III—1
(2600° F.)

| Degrees C. | 1A | 1C | 1D | 1G |
|---|---|---|---|---|
| 30 | 772 | 670 | 286 | 1,170 |
| 40 | 748 | 631 | 270 | 1,140 |
| 50 | 697 | 596 | 236 | 1,050 |
| 60 | 637 | 535 | 219 | 912 |
| 70 | 571 | 455 | 196 | 827 |
| 80 | 502 | 392 | 173 | 737 |
| 90 | 436 | 336 | 148 | 685 |
| 100 | 371 | 284 | 119 | 564 |
| 110 | 303 | 231 | 97.6 | 443 |
| 120 | 244 | 183 | 74.2 | 364 |
| 130 | 198 | 145 | 60.9 | 312 |
| 140 | 155 | 112 | 46.7 | 249 |
| 150 | 116 | 85.8 | 36.4 | 187 |
| 150[1] | 105 | 82.5 | 31.1 | 170 |

[1] After 10-minute soak.

Table III—2
(1800° F.)

| Degrees C. | 2A | 2B | 2C | 2D | 2E | 2F |
|---|---|---|---|---|---|---|
| 30 | 0.506 | 0.746 | 5.25 | 17.4 | 73.7 | 525 |
| 40 | 0.464 | 0.719 | 4.83 | 16.7 | 71.1 | 500 |
| 50 | 0.438 | 0.682 | 4.68 | 15.7 | 66.4 | 464 |
| 60 | 0.403 | 0.635 | 4.36 | 14.6 | 62.1 | 428 |
| 70 | 0.368 | 0.577 | 3.96 | 13.5 | 56.9 | 392 |
| 80 | 0.328 | 0.530 | 3.53 | 12.2 | 52.1 | 356 |
| 90 | 0.286 | 0.471 | 3.12 | 10.9 | 46.4 | |
| 100 | 0.244 | 0.414 | 2.76 | 9.65 | 40.7 | 2.67 |
| 110 | 0.202 | 0.354 | 2.38 | 8.30 | 34.5 | 2.32 |
| 120 | 0.160 | 0.294 | 2.00 | 7.00 | 28.9 | 191 |
| 130 | 0.126 | 0.244 | 1.68 | 5.82 | 23.8 | 152 |
| 140 | 0.0974 | 0.195 | 1.31 | 4.74 | 19.3 | 123 |
| 150 | 0.0738 | 0.153 | 1.03 | 3.80 | 15.7 | 96.8 |
| 150[1] | 0.0574 | 0.115 | 0.833 | 3.24 | 13.2 | 88.0 |

(1600° F.)

| Degrees C. | 2A | 2B | 2C | 2D | 2E | 2F |
|---|---|---|---|---|---|---|
| 30 | 0.0587 | 0.0823 | 0.221 | 1.20 | 10.3 | 376 |
| 40 | 0.0576 | 0.0801 | 0.215 | 1.16 | 9.95 | 356 |
| 50 | 0.0550 | 0.0764 | 0.206 | 1.12 | 9.50 | 335 |
| 60 | 0.0524 | 0.0727 | 0.197 | 1.05 | 8.83 | 305 |
| 70 | 0.0486 | 0.0684 | 0.186 | 0.986 | 7.90 | 274 |
| 80 | 0.0451 | 0.0641 | 0.172 | 0.910 | 7.36 | 233 |
| 90 | 0.0417 | 0.0593 | 0.160 | 0.828 | 6.42 | 198 |
| 100 | 0.0379 | 0.0545 | 0.146 | 0.741 | | 163 |
| 110 | 0.0338 | 0.0489 | 0.132 | 0.656 | 4.95 | 121 |
| 120 | 0.0303 | 0.0440 | 0.118 | 0.575 | 4.15 | 99.5 |
| 130 | 0.0267 | 0.0392 | 0.105 | 0.493 | 3.48 | 82.7 |
| 140 | 0.0334 | 0.0342 | 0.0928 | 0.430 | 3.03 | 66.0 |
| 150 | 0.0203 | 0.0298 | 0.0806 | 0.370 | 2.49 | 52.1 |
| 150[1] | 0.0185 | 0.0271 | 0.0730 | 0.330 | 2.23 | 45.6 |

(1500° F.)

| Degrees C. | 2D | 2E | 2F |
|---|---|---|---|
| 30 | 1.11 | 10.7 | 510 |
| 40 | 1.06 | 10.1 | 478 |
| 50 | 1.01 | 9.63 | 439 |
| 60 | 0.949 | 9.09 | 411 |
| 70 | 0.877 | 8.45 | 372 |
| 80 | 0.806 | 7.59 | 324 |
| 90 | 0.735 | 6.63 | 270 |
| 100 | 0.648 | 5.81 | 220 |
| 110 | 0.566 | 5.04 | 171 |
| 120 | 0.494 | 4.36 | 134 |
| 130 | 0.424 | 3.70 | 105 |
| 140 | 0.364 | 3.07 | 82.6 |
| 150 | 0.314 | 2.56 | 66.1 |
| 150[1] | 0.281 | 2.28 | 56.5 |

[1] After 10-minute soak.

Table III—3
(1700° F.)
[Megohm/cm.]

| Degrees C. | 3A | 3B | 3C | 3D | 3E | 3F | 3G |
|---|---|---|---|---|---|---|---|
| 30 | 1,290 | 71.6 | 50 | 110 | 3.86 | 10.4 | 184 |
| 40 | 1,970 | 56.6 | 108 | 137 | 5.94 | 14.7 | 254 |
| 50 | 2,660 | 67.7 | 374 | 214 | 10.1 | 21.7 | 289 |
| 60 | 3,520 | 139 | 1,000 | 398 | 21.1 | 39.1 | 349 |
| 70 | 4,460 | 354 | 2,350 | 653 | 55.4 | 85.9 | 372 |
| 80 | 4,890 | 1,160 | 5,480 | 1,130 | 196 | 234 | 349 |
| 90 | 4,290 | 2,740 | 13,400 | 7,230 | 516 | 761 | 303 |
| 100 | | 6,700 | 29,500 | 4,660 | 1,380 | 1,900 | 259 |
| 110 | 3,540 | 15,900 | 63,400 | 10,200 | 3,390 | 4,720 | 224 |
| 120 | 2,620 | 28,800 | 127,000 | 21,200 | 8,080 | 11,100 | 195 |
| 130 | 1,850 | 58,800 | 218,000 | 50,200 | 18,400 | 22,200 | 165 |
| 140 | 1,300 | 93,400 | 400,000 | 96,500 | 39,200 | 46,100 | 126 |
| 150 | 944 | 137,000 | 675,000 | 163,000 | 67,100 | 84,200 | 82.6 |
| 150[1] | 755 | 207,000 | 735,000 | 242,000 | 131,000 | 163,000 | 67.9 |

(1950° F.)

| Degrees C. | 3B | 3C | 3D | 3E | 3F |
|---|---|---|---|---|---|
| 30 | 87.9 | 344 | 283 | 126 | 8,100 |
| 40 | 76.5 | 323 | 258 | 122 | 7,610 |
| 50 | 65.0 | 293 | 224 | 115 | 6,610 |
| 60 | 53.6 | 248 | | 101 | 5,480 |
| 70 | 42.9 | 204 | 155 | 89.5 | 4,140 |
| 80 | 32.7 | 165 | 123 | 72.1 | 3,100 |
| 90 | 24.2 | 125 | 93.1 | 55.0 | 2,240 |
| 100 | 17.0 | 90.6 | 67.9 | 41.4 | 1,570 |
| 110 | 11.9 | 62.5 | 45.9 | 29.8 | 1,050 |
| 120 | 7.60 | 42.6 | 32.0 | 19.8 | 690 |
| 130 | 5.10 | 29.0 | 22.2 | 12.3 | 438 |
| 140 | 3.39 | 19.4 | 15.1 | 7.69 | 276 |
| 150 | 2.27 | 12.9 | 10.5 | 4.14 | 181 |
| 150[1] | 1.92 | 10.2 | 8.19 | 3.08 | 147 |

[1] After 10-minute soak.

Table III—4

(1950° F.)

| Degrees C. | 4A | 4B | 4C | 4D | 4E | 4F |
|---|---|---|---|---|---|---|
| 30 | 3,040 | 2,370 | 6,020 | 1,490 | 399 | 44 |
| 40 | 2,890 | 2,540 | 6,390 | 1,430 | 361 | 41.6 |
| 50 | 3,040 | 3,140 | 8,000 | 1,300 | 313 | 38.9 |
| 60 | 3,180 | 4,660 | 10,300 | 1,170 | 282 | 35.0 |
| 70 | 3,100 | 6,780 | 15,700 | 1,000 | 244 | 30.5 |
| 80 | 2,790 | 9,750 | 23,100 | 846 | 203 | 26.8 |
| 90 | 2,280 | 11,400 | 28,500 | 708 | 164 | 22.2 |
| 100 | 1,830 | 9,880 | 27,200 | 545 | 131 | 19.3 |
| 110 | 1,580 | 8,060 | 21,900 | 425 | 112 | 15.5 |
| 120 | 1,240 | 6,400 | 16,000 | 330 | 79.3 | 13.0 |
| 130 | 942 | 4,540 | 11,300 | 244 | 59.8 | 10.0 |
| 140 | 738 | 3,260 | 7,910 | 186 | 45.6 | 7.95 |
| 150 | 549 | 2,420 | 5,560 | 139 | 34.5 | 6.16 |
| 150[1] | 461 | 2,080 | 4,190 | 110 | 30.4 | 5.68 |
| 160 | | 1,740 | 3,570 | | | |
| 170 | | 1,440 | 2,830 | | | |
| 180 | | 1,200 | 2,190 | | | |
| 190 | | 950 | 1,620 | | | |
| 200 | | 742 | 1,290 | | | |

(2200° F.)

| Degrees C. | 4A | 4B | 4C | 4D | 4E | 4F |
|---|---|---|---|---|---|---|
| 30 | 5,810 | 1,200 | 145 | 52.2 | 22.9 | 0.675 |
| 40 | 5,270 | 1,070 | 130 | 46.8 | 21.1 | 0.630 |
| 50 | 4,690 | 970 | 115 | 42.8 | 18.1 | 0.590 |
| 60 | 3,980 | 842 | 89.2 | 25.0 | 16.0 | 0.527 |
| 70 | 3,550 | 700 | 82.0 | 31.4 | 13.6 | 0.473 |
| 80 | 2,820 | 581 | 67.4 | 24.7 | 11.4 | 0.412 |
| 90 | 2,250 | 470 | 54.9 | 20.9 | 9.06 | 0.355 |
| 100 | 1,780 | 371 | 42.8 | 16.5 | 7.06 | 0.302 |
| 110 | 1,340 | 288 | 33.7 | 13.0 | 5.48 | 0.248 |
| 120 | 983 | 221 | 26.0 | 9.99 | 4.40 | 0.204 |
| 130 | 722 | 166 | 19.5 | 7.56 | 3.43 | 0.167 |
| 140 | 515 | 126 | 14.8 | 5.62 | 2.60 | 0.135 |
| 150 | 380 | 94.9 | 11.2 | 4.18 | 2.01 | 0.111 |
| 150[1] | 307 | 80.3 | 8.96 | 3.60 | 1.65 | 0.0976 |

(2500° F.)

| Degrees C. | 4A | 4B | 4C | 4D | 4E | 4F |
|---|---|---|---|---|---|---|
| 30 | 754 | 1.98 | 1.85 | 1.21 | 0.661 | 0.187 |
| 40 | 724 | 1.96 | 1.72 | 1.11 | 0.639 | 0.179 |
| 50 | 664 | 1.85 | 1.57 | 1.02 | 0.600 | 0.171 |
| 60 | 622 | 1.70 | 1.39 | 0.911 | 0.549 | 0.160 |
| 70 | 562 | 1.55 | 1.24 | 0.796 | 0.505 | 0.147 |
| 80 | 494 | 1.37 | 1.07 | 0.681 | 0.450 | 0.136 |
| 90 | 422 | 1.19 | 0.914 | 0.586 | 0.392 | 0.121 |
| 100 | 368 | 1.03 | 0.762 | 0.490 | 0.336 | 0.115 |
| 110 | 287 | 0.865 | 0.622 | 0.398 | 0.283 | 0.0949 |
| 120 | 234 | 0.722 | 0.505 | 0.336 | 0.239 | 0.0816 |
| 130 | 204 | 0.595 | 0.407 | 0.269 | 0.196 | 0.0720 |
| 140 | 158 | 0.471 | 0.337 | 0.221 | 0.161 | 0.0635 |
| 150 | 125 | 0.378 | 0.275 | 0.179 | 0.133 | 0.0538 |
| 150[1] | 117 | 0.363 | 0.235 | 0.157 | 0.116 | 0.0477 |

[1] After 10-minute soak.

Table III—5

(1800° F.)

| Degrees C. | 5D | 5E | 5F |
|---|---|---|---|
| 30 | 48.5 | 39.4 | 27.7 |
| 40 | 44.8 | 37.1 | 25.3 |
| 50 | 40.2 | 33.8 | 23.0 |
| 60 | 36.3 | 29.7 | 21.8 |
| 70 | 31.1 | 25.8 | 19.2 |
| 80 | 26.6 | 22.1 | 16.5 |
| 90 | 22.7 | 18.7 | 13.5 |
| 100 | 18.8 | 15.8 | 12.0 |
| 110 | 15.7 | 13.1 | 9.98 |
| 120 | 13.2 | 11.2 | 8.35 |
| 130 | 11.1 | 9.66 | 7.21 |
| 140 | 9.50 | 8.55 | 6.58 |
| 150 | 8.21 | 7.66 | 5.85 |
| 150[1] | 7.74 | 7.14 | 5.49 |

(1950° F.)

| Degrees C. | 5A | 5B | 5C | 5D | 5E | 5F |
|---|---|---|---|---|---|---|
| 30 | 16,400 | 15,000 | 16,200 | 5,260 | 9,100 | 5,410 |
| 40 | 14,900 | 14,200 | 15,000 | 4,790 | 8,440 | 4,880 |
| 50 | 13,700 | 13,200 | 13,400 | 4,310 | 7,480 | 4,390 |
| 60 | 11,900 | 12,000 | 11,500 | 3,720 | 6,410 | 3,770 |
| 70 | 10,200 | 10,700 | 9,800 | 3,120 | 5,460 | 3,060 |
| 80 | 8,500 | 9,410 | 8,040 | 2,540 | 4,440 | 2,460 |
| 90 | 7,070 | 8,110 | 6,460 | 2,000 | 3,480 | 1,920 |
| 100 | 5,620 | 8,980 | 5,010 | 1,560 | 2,720 | 1,460 |
| 110 | 4,470 | 5,720 | 3,880 | 1,160 | 2,080 | 1,200 |
| 120 | 3,430 | 4,760 | 2,930 | 849 | 1,530 | 811 |
| 130 | 2,600 | 3,820 | 2,230 | 616 | 1,120 | 600 |
| 140 | 2,020 | 3,180 | 1,670 | 451 | 809 | 422 |
| 150 | 1,600 | 2,590 | 1,270 | 336 | 591 | 296 |
| 150[1] | 1,450 | 2,380 | 1,110 | 290 | 480 | 254 |

(2250° F.)

| Degrees C. | 5A | 5B | 5C |
|---|---|---|---|
| 30 | 2,560 | 1,500 | 403 |
| 40 | 2,360 | 1,390 | 382 |
| 50 | 2,150 | 1,270 | 354 |
| 60 | 1,910 | 1,140 | 317 |
| 70 | 1,630 | 966 | 280 |
| 80 | 1,370 | 815 | 244 |
| 90 | 1,120 | 688 | 207 |
| 100 | 906 | 542 | 173 |
| 110 | 704 | 429 | 139 |
| 120 | 539 | 332 | 113 |
| 130 | 414 | 256 | 91.0 |
| 140 | 311 | 200 | 72.5 |
| 150 | 240 | 155 | 57.4 |
| 150[1] | 208 | 134 | 50.9 |

(2450° F.)

| Degrees C. | 5A | 5B | 5C |
|---|---|---|---|
| 30 | 2,940 | 1,650 | 240 |
| 40 | 2,710 | 1,530 | 227 |
| 50 | 2,480 | 1,360 | 207 |
| 60 | 2,200 | 1,170 | 187 |
| 70 | 1,880 | 1,010 | 165 |
| 80 | 1,550 | 841 | 143 |
| 90 | 1,260 | 880 | 120 |
| 100 | 998 | 548 | 101 |
| 110 | 786 | 428 | 81.2 |
| 120 | 597 | 335 | 65.5 |
| 130 | 460 | 253 | 51.6 |
| 140 | 340 | 195 | 41.6 |
| 150 | 260 | 152 | 33.2 |
| 150[1] | 220 | 132 | 29.4 |

[1] After 10-minute soak.

Table III—6

(1300° F.)

| Degrees C. | 6D | 6E | 6F |
|---|---|---|---|
| 30 | 0.0484 | 0.0176 | 0.0141 |
| 40 | 0.0406 | 0.0171 | 0.0138 |
| 50 | 0.0383 | 0.0164 | 0.0132 |
| 60 | 0.0357 | 0.0155 | 0.0124 |
| 70 | 0.0331 | 0.0144 | 0.0117 |
| 80 | 0.0307 | 0.0134 | 0.0108 |
| 90 | 0.0275 | 0.0123 | 0.00995 |
| 100 | 0.0245 | 0.0111 | 0.00921 |
| 110 | 0.0217 | 0.00944 | 0.00825 |
| 120 | 0.0190 | 0.00892 | 0.00739 |
| 130 | 0.0170 | 0.00794 | 0.00638 |
| 140 | 0.0151 | 0.00714 | 0.00600 |
| 150 | 0.0132 | 0.00644 | 0.00547 |
| 150[1] | 0.0128 | 0.00619 | 0.00514 |

(1600° F.)

| Degrees C. | 6A | 6B | 6C | 6D | 6E | 6F |
|---|---|---|---|---|---|---|
| 30 | 798 | 62.7 | 0.995 | 0.0678 | 0.0775 | 0.163 |
| 40 | 751 | 56.7 | 0.914 | 0.0646 | 0.0742 | 0.157 |
| 50 | 669 | 55.1 | 0.881 | 0.0513 | 0.0705 | 0.147 |
| 60 | 570 | 44.6 | 0.810 | 0.0568 | 0.0666 | 0.135 |
| 70 | 483 | 37.8 | 0.735 | 0.0523 | 0.0616 | 0.125 |
| 80 | 404 | 31.8 | 0.660 | 0.0475 | 0.0505 | 0.113 |
| 90 | 294 | 26.4 | 0.583 | 0.0430 | 0.0520 | 0.102 |
| 100 | 246 | 21.0 | 0.504 | 0.0381 | 0.0468 | 0.0886 |
| 110 | 190 | 16.6 | 0.430 | 0.0330 | 0.0414 | 0.0771 |
| 120 | 140 | 12.7 | 0.373 | 0.0284 | 0.0362 | 0.0670 |
| 130 | 104 | 10.1 | 0.310 | 0.0246 | 0.0313 | 0.0576 |
| 140 | 77.3 | 7.92 | 0.270 | 0.0214 | 0.0269 | 0.0499 |
| 150 | 56.1 | 6.31 | 0.231 | 0.0188 | 0.0233 | 0.0438 |
| 150[1] | 47.9 | 5.83 | 0.215 | 0.0179 | 0.0220 | 0.0420 |

(2000° F.)

| Degrees C. | 6A | 6B | 6C |
|---|---|---|---|
| 30 | 411 | 24.9 | 0.377 |
| 40 | 384 | 23.5 | 0.359 |
| 50 | 346 | 20.6 | 0.334 |
| 60 | 305 | 19.5 | 0.312 |
| 70 | 259 | 16.6 | 0.285 |
| 80 | 216 | 14.8 | 0.248 |
| 90 | 178 | 12.3 | 0.230 |
| 100 | 124 | 10.2 | 0.200 |
| 110 | 110 | 8.55 | 0.180 |
| 120 | 84.4 | 6.94 | 0.159 |
| 130 | 63.5 | 5.56 | 0.129 |
| 140 | 47.0 | 4.59 | 0.110 |
| 150 | 35.7 | 3.76 | 0.0955 |
| 150[1] | 32.5 | 3.33 | 0.0915 |

[1] After 10-minute soak.

Table III—7

(1600° F.)

| Degrees C. | 7A | 7B | 7D | 7E | 7F |
|---|---|---|---|---|---|
| 30 | 342 | 244 | 17.0 | 16.3 | 11.9 |
| 40 | 310 | 223 | 15.6 | 15.2 | 11.4 |
| 50 | 280 | 201 | 14.0 | 13.9 | 10.5 |
| 60 | 255 | 175 | 11.9 | 12.3 | 9.54 |
| 70 | 234 | 149 | 10.0 | 10.7 | 8.40 |
| 80 | 218 | 126 | 8.19 | 8.89 | 7.27 |
| 90 | 205 | 100 | 6.74 | 7.46 | 7.15 |
| 100 | 176 | 79.7 | 5.86 | 6.91 | 6.61 |
| 110 | 152 | 64.0 | 4.51 | 5.71 | 5.49 |
| 120 | 130 | 48.7 | 3.48 | 4.50 | 4.50 |
| 130 | 111 | 37.1 | 2.70 | 3.52 | 3.60 |
| 140 | 93.6 | 28.2 | 2.06 | 2.86 | 2.84 |
| 150 | 77.4 | 21.5 | 1.56 | 2.14 | 2.44 |
| 150[1] | 69.6 | 18.8 | 1.36 | 1.87 | 2.11 |

(1800° F.)

| Degrees C. | 7A | 7B | 7C | 7D | 7E | 7F |
|---|---|---|---|---|---|---|
| 30 | 131 | 2.79 | 0.0272 | 0.0421 | 0.0187 | 0.00183 |
| 40 | 123 | 2.54 | 0.0265 | 0.0397 | 0.0179 | 0.00179 |
| 50 | 114 | 2.27 | | 0.0386 | 0.0174 | 0.00176 |
| 60 | 107 | 2.00 | 0.0252 | 0.0360 | 0.0164 | 0.00175 |
| 70 | 102 | 1.74 | 0.0240 | 0.0331 | 0.0154 | 0.00165 |
| 80 | 98.0 | 1.46 | 0.0227 | 0.0296 | 0.0140 | 0.00158 |
| 90 | 92.0 | 1.20 | 0.0213 | 0.0264 | 0.0127 | 0.00150 |
| 100 | 82.9 | 0.971 | 0.0198 | 0.0232 | 0.0113 | 0.00142 |
| 110 | 77.8 | 0.846 | 0.0183 | 0.0202 | 0.0100 | 0.00112 |
| 120 | 73.2 | 0.659 | 0.0166 | 0.0173 | 0.00870 | 0.00125 |
| 130 | 65.6 | 0.501 | 0.0150 | 0.0148 | 0.00745 | 0.00115 |
| 140 | 56.9 | 0.380 | 0.0136 | 0.0126 | 0.00614 | 0.00107 |
| 150 | 46.5 | 0.295 | 0.0121 | 0.0106 | 0.00531 | 0.000994 |
| 150[1] | 42.5 | 0.261 | 0.0116 | 0.00951 | 0.00477 | 0.000959 |

(2000° F.)

| Degrees C. | 7C | 7D | 7E | 7F |
|---|---|---|---|---|
| 30 | 0.0198 | 0.0350 | 0.0234 | 0.0270 |
| 40 | 0.0191 | 0.0340 | 0.0227 | 0.0260 |
| 50 | 0.0180 | 0.0322 | 0.0216 | 0.0250 |
| 60 | 0.0168 | 0.0302 | 0.0204 | 0.0234 |
| 70 | 0.0155 | 0.0280 | 0.0190 | 0.0218 |
| 80 | 0.0140 | 0.0254 | 0.0175 | 0.0200 |
| 90 | 0.0125 | 0.0226 | 0.0158 | 0.0182 |
| 100 | 0.0115 | 0.0201 | 0.0142 | 0.0164 |
| 110 | 0.0102 | 0.0176 | 0.0127 | 0.0146 |
| 120 | 0.00899 | 0.0152 | 0.0112 | 0.0130 |
| 130 | 0.00801 | 0.0131 | 0.00980 | 0.0113 |
| 140 | 0.00736 | 0.0112 | 0.00854 | 0.00991 |
| 150 | 0.00645 | 0.00956 | 0.00741 | 0.00866 |
| 150[1] | 0.00593 | 0.00898 | 0.00695 | 0.00814 |

[1] After 10-minute soak.

Table III—8

(1100° F.)

| Degrees C. | 8A | 8B | 8C | 8D | 8E | 8F |
|---|---|---|---|---|---|---|
| 30 | 3.18 | 0.462 | 0.137 | 0.111 | 0.0914 | 0.0656 |
| 40 | 2.94 | 0.426 | 0.131 | 0.104 | 0.0852 | 0.0628 |
| 50 | 2.66 | 0.397 | 0.123 | 0.0970 | 0.0819 | 0.0586 |
| 60 | 2.32 | 0.348 | 0.111 | 0.0891 | 0.0771 | 0.0540 |
| 70 | 2.00 | 0.304 | 0.102 | 0.0797 | 0.0710 | 0.0488 |
| 80 | 1.64 | 0.258 | 0.0878 | 0.0704 | 0.0629 | 0.0421 |
| 90 | 1.33 | 0.185 | 0.0751 | 0.0612 | 0.0548 | 0.0351 |
| 100 | 1.04 | 0.167 | 0.0621 | 0.0527 | 0.0463 | 0.0292 |
| 110 | 0.816 | 0.128 | 0.0469 | 0.0431 | 0.0378 | 0.0231 |
| 120 | 0.623 | 0.0980 | 0.0387 | 0.0344 | 0.0300 | 0.0181 |
| 130 | 0.489 | 0.0746 | 0.0298 | 0.0274 | 0.0231 | 0.0142 |
| 140 | 0.371 | 0.0575 | 0.0223 | 0.0215 | 0.0185 | 0.0113 |
| 150 | 0.279 | 0.0444 | 0.0174 | 0.0172 | 0.0147 | 0.00915 |
| 150[1] | 0.242 | 0.0382 | 0.0154 | 0.0146 | 0.0130 | 0.00816 |

(1200° F.)

| Degrees C. | 8A | 8B | 8C | 8D | 8E | 8F |
|---|---|---|---|---|---|---|
| 30 | 1.30 | 0.0544 | 0.0693 | 0.0725 | 0.0878 | 0.0505 |
| 40 | 1.22 | 0.0520 | 0.0661 | 0.0693 | 0.0845 | 0.0494 |
| 50 | 1.10 | 0.0494 | 0.0624 | 0.0655 | 0.0799 | 0.0470 |
| 60 | 0.996 | 0.0460 | 0.0578 | 0.0596 | 0.0746 | 0.0445 |
| 70 | 0.870 | 0.0423 | 0.0530 | 0.0560 | 0.0686 | 0.0408 |
| 80 | 0.759 | 0.0380 | 0.0478 | 0.0509 | 0.0620 | 0.0369 |
| 90 | 0.643 | 0.0338 | 0.0414 | 0.0449 | 0.0549 | 0.0322 |
| 100 | 0.539 | 0.0300 | 0.0368 | 0.0359 | 0.0483 | 0.0266 |
| 110 | 0.442 | 0.0261 | 0.0317 | 0.0342 | 0.0406 | 0.0220 |
| 120 | 0.369 | 0.0224 | 0.0263 | 0.0288 | 0.0339 | 0.0179 |
| 130 | 0.306 | 0.0190 | 0.0213 | 0.0238 | 0.0277 | 0.0141 |
| 140 | 0.252 | 0.0161 | 0.0169 | 0.0193 | 0.0218 | 0.0114 |
| 150 | 0.214 | 0.0138 | 0.0137 | 0.0152 | 0.0169 | 0.00910 |
| 150[1] | 0.188 | 0.0120 | 0.0114 | 0.0124 | 0.0133 | 0.00733 |

[1] After 10-minute soak.

Table III—9

(1400° F.)

| Degrees C. | 9A | 9B | 9C | 9D | 9E | 9F |
|---|---|---|---|---|---|---|
| 30 | 1.07 | 1,590 | 460 | 431 | 409 | 19.7 |
| 40 | 0.981 | 1,530 | 442 | | 332 | 17.7 |
| 50 | 0.881 | 1,350 | 396 | 292 | 274 | 15.7 |
| 60 | 0.744 | 1,180 | 342 | 245 | 235 | |
| 70 | 0.671 | 980 | 288 | 207 | 218 | 14.2 |
| 80 | 0.574 | 796 | 234 | 175 | 180 | 13.1 |
| 90 | 0.484 | 629 | 184 | 155 | 159 | 12.6 |
| 100 | 0.394 | 476 | 146 | | 152 | 12.8 |
| 110 | 0.320 | 362 | 111 | 140 | 147 | 13.4 |
| 120 | 0.256 | 260 | 89.4 | 131 | 145 | 14.5 |
| 130 | 0.201 | 189 | 68.0 | 120 | 138 | 16.3 |
| 140 | 0.160 | 132 | 52.0 | 107 | 130 | 19.1 |
| 150 | 0.132 | 98.0 | 39.5 | 87.6 | 114 | 23.1 |
| 150[1] | 0.125 | 76.4 | 32.4 | 81.8 | 109 | 34.2 |

(1600° F.)

| Degrees C. | 9A | 9B | 9C | 9D | 9E | 9F |
|---|---|---|---|---|---|---|
| 30 | 0.545 | 0.721 | 3.12 | 3.74 | 8.67 | 12.2 |
| 40 | 0.523 | 0.671 | 2.94 | 3.46 | 7.95 | 10.9 |
| 50 | 0.488 | 0.622 | 2.72 | 3.17 | 7.26 | 9.80 |
| 60 | 0.452 | 0.589 | 2.48 | 2.87 | 6.41 | 14.5 |
| 70 | 0.401 | 0.534 | 2.18 | 2.55 | 5.67 | 13.5 |
| 80 | 0.355 | 0.475 | 1.91 | 2.21 | 4.89 | 12.0 |
| 90 | 0.306 | 0.413 | 1.69 | 1.90 | 4.10 | 10.6 |
| 100 | 0.256 | 0.351 | 1.45 | 1.60 | 3.37 | 9.30 |
| 110 | 0.210 | 0.295 | 1.37 | 1.34 | 2.78 | 7.86 |
| 120 | 0.170 | 0.246 | 1.11 | 1.30 | 2.27 | 6.80 |
| 130 | 0.140 | 0.205 | 0.926 | 1.17 | 1.82 | 5.82 |
| 140 | 0.116 | 0.173 | 0.773 | 0.990 | 1.47 | 4.97 |
| 150 | 0.0891 | 0.142 | 0.625 | 0.810 | 1.20 | 4.23 |
| 150[1] | 0.0744 | 0.126 | 0.541 | 0.696 | 1.06 | 3.78 |

[1] After 10-minute soak.

TABLE III—10

(1400° F.)

| Degrees C. | 10A | 10B | 10C | 10D | 10E | 10F |
|---|---|---|---|---|---|---|
| 30 | 9.76 | 27.8 | 51.0 | 267 | 297 | 467 |
| 40 | 9.56 | 26.2 | 50.5 | 264 | 368 | 466 |
| 50 | 9.05 | 24.6 | 48.5 | 254 | 443 | 479 |
| 60 | 8.34 | 22.4 | 45.5 | 242 | 500 | 531 |
| 70 | 7.50 | 20.2 | 41.8 | 232 | 608 | 654 |
| 80 | 6.79 | 17.8 | 37.3 | 218 | 682 | 905 |
| 90 | 6.19 | 15.3 | 33.3 | 202 | 816 | 1,390 |
| 100 | 5.39 | 13.0 | 28.8 | 178 | 950 | 2,120 |
| 110 | 4.55 | 11.3 | 24.4 | 148 | 1,040 | 2,900 |
| 120 | 3.72 | 9.44 | 20.5 | 121 | 1,000 | 3,460 |
| 130 | 3.08 | 7.85 | 16.9 | 96.0 | 811 | 3,520 |
| 140 | 2.52 | 6.49 | 13.9 | 75.2 | 592 | 3,000 |
| 150 | 2.22 | 5.49 | 11.6 | 57.6 | 400 | 2,100 |
| 150[1] | 1.89 | 4.84 | 10.5 | 49.3 | 311 | 1,580 |

(1800° F.)

| Degrees C. | 10A | 10B | 10C | 10D | 10E | 10F |
|---|---|---|---|---|---|---|
| 30 | 3.52 | 20.2 | 28.9 | 78.1 | 130 | 26.1 |
| 40 | 3.39 | 18.7 | 28.3 | 74.1 | 114 | 23.5 |
| 50 | 3.18 | 17.1 | 23.8 | 67.7 | 96.6 | 20.4 |
| 60 | 2.98 | 15.2 | 23.2 | 60.5 | 78.4 | 16.6 |
| 70 | 2.72 | 13.2 | 20.7 | 52.6 | 60.6 | 13.0 |
| 80 | 2.44 | 11.5 | 17.4 | 43.6 | 45.1 | 11.2 |
| 90 | 2.14 | 11.3 | 14.6 | 35.4 | 32.6 | 8.52 |
| 100 | 1.84 | 9.16 | 12.2 | 26.4 | 22.0 | 6.36 |
| 110 | 1.53 | 7.24 | 11.3 | 21.1 | 15.6 | 4.61 |
| 120 | 1.28 | 5.73 | 9.19 | 15.6 | 11.4 | 3.16 |
| 130 | 1.08 | 4.46 | 7.19 | 11.4 | 7.80 | 2.20 |
| 140 | 0.896 | 3.44 | 5.60 | 8.94 | 5.34 | 1.51 |
| 150 | 0.744 | 2.72 | 4.38 | 6.50 | 3.69 | 1.06 |
| 150[1] | 0.666 | 2.33 | 3.68 | 5.18 | 2.78 | 0.871 |

[1] After 10-minute soak.

SPECIAL CHARACTERISTICS

As indicated above, certain of the bodies showed special characteristics. These are as follows. Where temperature figures are given, the firing temperature of the body in degrees F is understood.

*Magnetic permeability.*—Shown by bodies according to Example 7 as follows:

None: 7A (1800°), 7A (1900°), 7B (2000°), 7B (2100°), 7C (2100°).

Slight: 7A (1600°), 7B (1600°), 7B (1900°), 7C (1600°), 7C (2000°), 7D (1600°), 7D (1700°), 7E (1600°), 7E (1700°), 7F (1600°), 7F (1700°).

Moderate: 7A (1700°), 7B (1700°), 7B (1800°), 7C (1700°), 7D (2100°).

Strong: 7C (1800°), 7C (1900°), 7D (1800°), 7D (1900°), 7D (2000°), 7D (2200°), 7E (1800°), 7E (1900°), 7E (2000°), 7E (2100°), 7E (2200°), 7F (1800°), 7F (1900°), 7F (2000°), 7F (2100°).

*Hand effect.*—This effect, noted above, is possessed by the following bodies. All bodies according to Example 2, fired at all temperatures, particularly bodies 2C, 2D, 2E and 2F; all bodies according to Example 3, fired at 1600°, 1700°, 1800° and 2250°; bodies 5E (1800°) and 5F (1800°).

The above data indicates that better and more uniform results may be obtained at some firing temperatures for some of the bodies than at other temperatures. The following Table IV shows the preferred firing temperatures (degrees F.) according to the various examples.

TABLE IV

*Example Number—*
1. 2200° to 2600° and above.
2. 1200° to 1600° for A, B and C.
   1200° to 1800° for D, E and F.
3. 1650° to 1900° for A and G.
   1600° to 2250° for B.
   1700° to 2250° and above for D, E and F.
4. 2200° to 2500° and above for A, B and C.
   2000° to 2500° for D, E and F.
5. 1800° to 2500° for A, B and C.
   1600° to 2200° for D, E and F.
6. 1400° to 2100° and above for A, B and C.
   1250° to 1800° for D.
   1250° to 1600° for E and F.
7. 1600° to 1850° for A.
   1700° to 2100° for B.
   1800° to 2200° for C, D, E and F.
8. 1100° to 1500° for A.
   1100° to 1300° for B.
   1100° to 1200° for C, D, E and F.
9. 1200° to 1800° and above for A and B.
   1200° to 1800° for C, D, E and F.
10. 1200° to 2000° and above.

APPLICATIONS

From the above description it will be seen that in the practice of the present invention, bodies of a wide range of electrical characteristics can be obtained. They can be applied to many and varied uses. Thus, bodies having resistivities less than a few tenths of a kilohm per cm. may find application in volume controls for radio circuits. Such bodies are those according to Examples 2, 4, 6, 7, 8 and 9. These bodies may also be used as safety valves for high frequency circuits, as dry rectifiers, photosensitive devices and photoelectric devices.

Bodies according to Example 4 are highly suitable as resistors in electric furnace applications, since they have melting or disintegration points above 2500° F. and resistivities in some cases less than 1 kilohm per cm.

Applications where a complete range of resistances is required will find a lead in the materials described herein. Assemblies requiring semiconducting surfaces to eliminate static interference, distinctive effects of lightning flash over, development of static electricity due to friction and elimination thereof all may find useful materials herein.

Feeder circuits involving fluorescent lighting systems require the insertion of a resistor with a power factor of 90% or more in order that more than one light may be operated economically and efficiently on a single line. As the present bodies all have very high power factors they may be used for this purpose.

Bodies exhibiting the "hand effect" can be used in burglar alarms on safe doors, dark jewelry windows, etc., the advantage being that no visible evidence of its presence need be necessary. Under normal conditions a small and steady current could be passed through the resistor of this sensitive type. As soon as the human hand passed in the close vicinity of the bare resistor the resistance would start to vary, said variation activating a relay and sounding the alarm. An electric key board for a musical instrument could be devised in the same general manner depending on the variation in resistance from human proximity. Also, safety devices for dangerous equipment could be fashioned of the material so that the variation in resistance would sound an alarm as soon as the variable resistor was touched.

As many variations are possible within the scope of this invention, it is not intended to be limited except as defined by the appended claims.

I claim:

1. An electrical resistor, comprising a ceramic body of essentially coherent non-porous structure, and having medium to low electrical resistivity, said body containing as its major ingredient a chromium titanate.

2. An electrical resistor, comprising a ceramic body of essentially coherent non-porous structure, and having medium to low electrical resistivity, said body comprising a fired mixture containing as its major ingredients a chromium titanate and iron oxide.

3. An electrical resistor, comprising a ceramic body of essentially coherent non-porous structure, and having medium to low electrical resistivity, said body comprising a fired mixture containing as its major ingredients titanium oxide and vanadium oxide.

4. An electrical resistor, comprising a ceramic body of essentially coherent non-porous structure, and having medium to low electrical resistivity, said body containing as its major ingredient a vanadium titanate.

5. An electrical resistor, comprising a ceramic body of essentially coherent non-porous structure, and having medium to low electrical resistivity, said body comprising a fired mixture containing as its major ingredients a vanadium titanate and iron oxide.

6. An electrical resistor, comprising a ceramic body of essentially coherent non-porous structure, and having medium to low electrical resistivity, said body containing as its major ingredient a copper titanate.

7. An electrical resistor, comprising a ceramic body of essentially coherent non-porous structure, and having medium to low electrical resistivity, said body comprising a fired mixture containing as its major ingredients a copper titanate and iron oxide.

8. An electrical resistor, comprising a ceramic body of essentially coherent non-porous structure, and having medium to low electrical resistivity, said body comprising a fired mixture containing as its major ingredients titanium oxide, copper oxide and vanadium oxide.

9. An electrical resistor, comprising a ceramic body of essentially coherent non-porous structure, and having medium to low electrical resistivity, said body comprising a fired mixture containing as its major ingredients a copper titanate and vanadium oxide.

10. An electrical resistor, comprising a ceramic body of essentially coherent non-porous structure, and having medium to low electrical resistivity, said body comprising a fired mixture containing as its major ingredients a vanadium titanate and copper oxide.

11. An electrical resistor, comprising a ceramic body of essentially coherent non-porous structure, and having medium to low electrical resistivity, said body comprising a fired mixture containing as its major ingredients a chromium titanate and copper oxide.

12. An electrical resistor, comprising a ceramic body of essentially coherent non-porous structure, and having medium to low electrical resistivity, said body comprising a fired mixture containing as its major ingredients titanium oxide, chromium oxide and vanadium oxide.

13. An electrical resistor, comprising a ceramic body of essentially coherent non-porous structure, and having medium to low electrical resistivity, said body comprising a fired mixture containing as its major ingredients a chromium titanate and vanadium oxide.

EUGENE WAINER.